(12) United States Patent
Marisa

(10) Patent No.: US 12,051,992 B2
(45) Date of Patent: Jul. 30, 2024

(54) SOLAR PANEL DEVICE AND SOLAR PANEL SYSTEM

(71) Applicant: Seleris Ventures Oy, Piikkiö (FI)

(72) Inventor: Mikael Marisa, Piikkiö (FI)

(73) Assignee: Seleris Ventures Oy, Piikkiö (FI)

( * ) Notice: Subject to any disclaimer, the term of this patent is extended or adjusted under 35 U.S.C. 154(b) by 18 days.

(21) Appl. No.: 18/185,705

(22) Filed: Mar. 17, 2023

(65) Prior Publication Data

US 2023/0370014 A1 Nov. 16, 2023

(51) Int. Cl.
*H02S 20/32* (2014.01)
*H02S 30/10* (2014.01)

(52) U.S. Cl.
CPC ............. *H02S 20/32* (2014.12); *H02S 30/10* (2014.12)

(58) Field of Classification Search
CPC ....... H01L 31/00–078; Y02E 10/50–60; H02S 20/00–32; H02S 30/00–20
USPC ................................................ 136/243–265
See application file for complete search history.

(56) References Cited

U.S. PATENT DOCUMENTS

| | | | | |
|---|---|---|---|---|
| 4,832,001 A | * | 5/1989 | Baer | F24S 50/20 136/246 |
| 2008/0066801 A1 | | 3/2008 | Schwarze | |
| 2010/0275904 A1 | | 11/2010 | Bathurst et al. | |
| 2015/0233607 A1 | * | 8/2015 | Behn | F24S 50/20 126/714 |
| 2018/0054156 A1 | | 2/2018 | Lokey | |
| 2019/0372514 A1 | | 12/2019 | Almy et al. | |
| 2021/0042802 A1 | | 2/2021 | Gharabegian | |
| 2023/0402961 A1 | * | 12/2023 | Fakhari | F24S 30/455 |

FOREIGN PATENT DOCUMENTS

| | | | |
|---|---|---|---|
| CN | 107152807 A | * | 9/2017 |
| CN | 212992262 U | * | 4/2021 |
| DE | 102006049690 A1 | | 5/2008 |
| KR | 101232762 B1 | * | 2/2013 |
| KR | 20200040999 A | * | 4/2020 |

(Continued)

OTHER PUBLICATIONS

Finnish Patent and Registration Office, Office Action, U.S. Appl. No. 20/225,413, mailed Jan. 16, 2024, 13 pages.

(Continued)

*Primary Examiner* — Bach T Dinh
(74) *Attorney, Agent, or Firm* — Ziegler IP Law Group LLC.

(57) ABSTRACT

Disclosed is a solar panel device with a support structure and a frame(s) configured to enclose solar panel(s). The frame is rotatably coupled to the support structure and a connecting member. A load is coupled to the support structure and frame using the connecting member. A first end of the connecting member is fastened to the frame on the first attachment point. An intermediate portion of the connecting member is connected to the support structure on second attachment point. The second end of the connecting member has the load attached thereto. The connecting member moves between the frame and the support structure for enabling the load to align the frame at given angle with the ground surface on which the support structure is arranged.

13 Claims, 9 Drawing Sheets

(56) References Cited

FOREIGN PATENT DOCUMENTS

KR  102268879 B1 * 6/2021
WO  2018128942 A1   7/2018

OTHER PUBLICATIONS

Finnish Patent and Registration Office, Search Report, U.S. Appl. No. 20/225,413, mailed Nov. 25, 2022, 2 pages.
European Patent Office, extended European search report, U.S. Appl. No. 23/163,016, filed Mar. 3, 2023, 7 pages.

* cited by examiner

SOLAR PANEL DEVICE AND SOLAR PANEL SYSTEM

TECHNICAL FIELD

The present disclosure relates to solar panel devices for harvesting solar energy. The present disclosure also relates to solar panel systems for harvesting the solar energy.

BACKGROUND

Increasing prices of fossil fuels and the prospect of expanding world oil reserves have created a demand for alternative energy sources that can supplement and/or replace some of the energy needs generated presently met by fossil fuels. In recent years, there has been a huge development in the field of solar energy harvesting. The conversion of solar energy into electricity reduces the need for the consumption of fossil fuels and is considered a clean energy solution. Presently, solar energy harvesting is one of the most widely-accessible and popular forms of alternative fuel to the general population of the world.

Solar energy can be harvested and converted into electricity. Various methods to harvest solar energy may be solar thermal collectors, solar cells, solar panels, etc. The solar panels use photovoltaic (PV) cells to convert the solar energy into electricity using photovoltaic effect. Electricity generated by solar panels can be used in factories, homes, and in various other similar facilities. Owing to the overall accessibility of solar energy, individuals or small businesses can own and control all or a significant portion of their electricity production using solar panels, without being dependent upon a power grid.

Traditionally, solar panel devices are installed at a location in a ground-mounted manner. Such ground-mount installations require heavy-duty foundations in order to resist high wind loads (of the order of hundreds of newtons per square metre). The need for a sturdy, rigid, frame to which the solar panels can be mounted and a heavy-duty foundation for the frame in order to resist the varying powerful and dynamic mechanical loads arises due to the following problems. Wind causes very strong and dynamic both vertical and horizontal forces, often simultaneously. Solar arrays of solar panel devices also suffer from torsional galloping as a semi-rigid structure is subject to a dynamic load. Furthermore, snow and ice loads that the solar arrays need to withstand can be very heavy downforce loads. The arrays need to also be able to withstand strong horizontal wind conditions when already loaded with heavy layers of snow and ice. Moreover, forces in the soil also cause problems such as frost movement, sagging & sinking and soil upthrust. Existing solar panel devices suffer from structural stability issues in light of such problems, and catastrophic structural failures are not uncommon.

However, the most common problem associated with a solar power plant (namely, a solar panel system) employing solar panel devices is a limitation of transferability. In other words, solar power plants are extremely difficult to transfer from one location to another. The structural and financial long-term nature of the traditional heavy-duty ground-mount solar power plant requires a very long legal and financial commitment to the physical location where the solar power plant is installed. The solar power plant has a long amortization period of approximately 10 years and a very long economic lifespan of approximately 35 years. Therefore, the solar power plant may incur huge economic losses if it is not utilized for as long as its economic life span.

For example, if the solar power plant is installed on rental land, the solar power plant cannot be easily transferred from that place in case a rental agreement ends since heavy-duty foundations make dismantling solar panel devices from one location and re-installing them to another location prohibitively expensive. As a result, the solar power plant may prove to be a huge business loss for owners of the land. Moreover, installation of ground-mount solar panel devices is impossible on multiple soil types. Further, owing to the limitation of transferability of the solar power plants, it is often difficult to lease solar power plants because if a lessee fails to pay, it is difficult for a lessor to recover the leased asset. Furthermore, solar power plants including ground-mounted solar panel devices having underground foundations require permits.

Therefore, in light of the foregoing discussion, there exists a need to overcome the aforementioned drawbacks of difficulty in transferability and structural failures of the solar power plant.

SUMMARY

The present disclosure seeks to provide a solar panel device. The present disclosure also seeks to provide a solar panel system. An aim of the present disclosure is to provide a solution that overcomes at least partially the problems encountered in prior art.

In a first aspect, an embodiment of the present disclosure provides a solar panel device comprising:
  a support structure;
  at least one frame adapted to enclose at least one solar panel,
  wherein the at least one frame is rotatably coupled to the support structure;
  at least one connecting member;
  at least one load coupled to the support structure and the at least one frame using the at least one connecting member, wherein
    a first end of the at least one connecting member is fastened to the at least one frame on at least one first attachment point,
    an intermediate portion of the at least one connecting member is connected to the support structure on at least one second attachment point, and
    a second end of the at least one connecting member has the least one load attached thereto, and wherein the at least one connecting member is configured to move between the at least one frame and the support structure for enabling the at least one load to align the at least one frame with respect to the support structure such that the at least one solar panel is at a given angle with respect to a ground surface on which the support structure is arranged;
  characterized in that,
  wherein the at least one frame (104, 302, 408, 606, 904) is rotatably coupled to the support structure (102, 412, 602, 812, 902) via at least two attachment means (114a, 114b) that are arranged on two opposite sides of the at least one frame, wherein the at least two attachment means lie along a rotational axis (A-A') of the at least one frame and enable rotation of the at least one solar panel (106) with respect to the ground surface,
  wherein the rotational axis (A-A') of the at least one frame (104, 302, 408, 606, 904) lies at a predefined distance from a central axis of the at least one frame which extends between the two opposite sides of the at least one frame, wherein the predefined distance lies in a range of 20%-80% of a total distance from the central axis to an end of the at least one frame, and wherein the predefined distance of the rotational axis from the central axis is selected in such a way that a balance is struck between sensitivity of the rotation of the at least one solar panel to external forces and a weight of the at least one load.

In a second aspect, an embodiment of the present disclosure provides a solar panel system comprising:

at least two solar panel devices according to the first aspect, wherein the at least two solar panel devices, in operation, convert solar energy into electricity; and at least one electrical device electrically coupled to the at least two solar panel devices, wherein the at least one electrical device, in operation, receives the electricity from the at least two solar panel devices.

Embodiments of the present disclosure substantially eliminate or at least partially address the aforementioned problems in the prior art, and provide a solar panel device which is easily transferable from one location to another, and has a configuration which provides structural stability as well as portability.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1A:
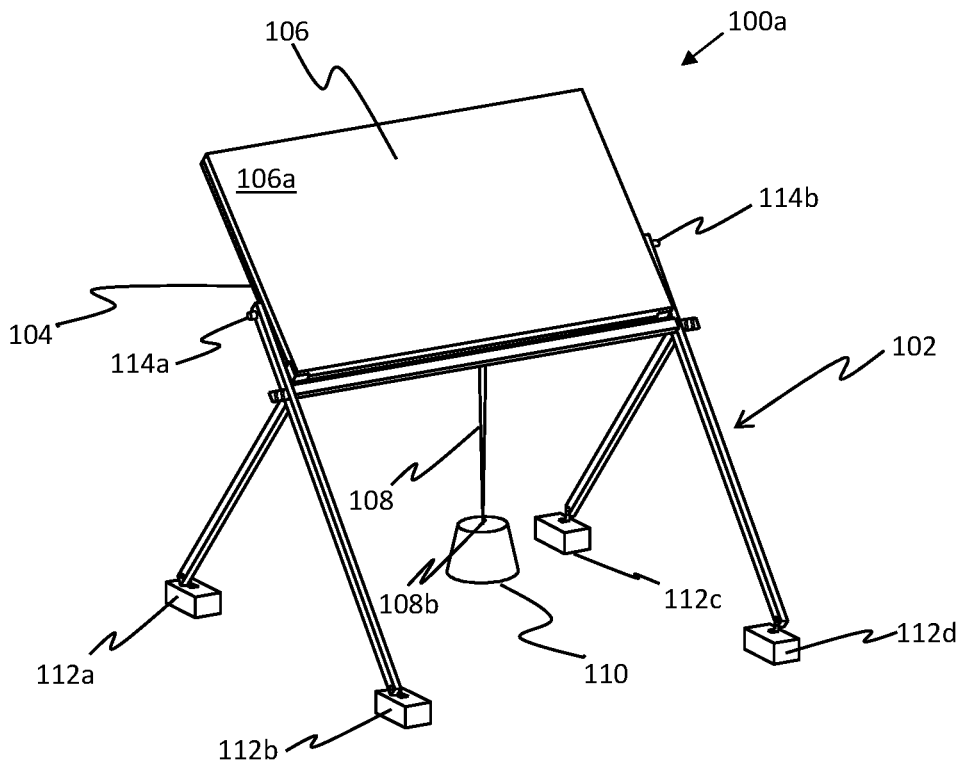
FIG. 1A is a perspective view of a solar panel device at a given angle with respect to a ground surface, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a solar panel device comprising:

a support structure;

at least one frame adapted to enclose at least one solar panel, wherein the at least one frame is rotatably coupled to the support structure;

at least one connecting member;

at least one load coupled to the support structure and the at least one frame using the at least one connecting member, wherein a first end of the at least one connecting member is fastened to the at least one frame on at least one first attachment point, an intermediate portion of the at least one connecting member is connected to the support structure on at least one second attachment point, and a second end of the at least one connecting member has the least one load attached thereto, and wherein the at least one connecting member is configured to move between the at least one frame and the support structure for enabling the at least one load to align the at least one frame with respect to the support structure such that the at least one solar panel is at a given angle with respect to a ground surface on which the support structure is arranged;

characterized in that, wherein the at least one frame (104, 302, 408, 606, 904) is rotatably coupled to the support structure (102, 412, 602, 812, 902) via at least two attachment means (114a, 114b) that are arranged on two opposite sides of the at least one frame, wherein the at least two attachment means lie along a rotational axis (A-A') of the at least one frame and enable rotation of the at least one solar panel (106) with respect to the ground surface, wherein the rotational axis (A-A') of the at least one frame (104, 302, 408, 606, 904) lies at a predefined distance from a central axis of the at least one frame which extends between the two opposite sides of the at least one frame, wherein the predefined distance lies in a range of 20%-80% of a total distance from the central axis to an end of the at least one frame, and wherein the predefined distance of the rotational axis from the central axis is selected in such a way that a balance is struck between sensitivity of the rotation of the at least one solar panel to external forces and a weight of the at least one load.

In a second aspect, an embodiment of the present disclosure provides a solar panel system comprising:

at least two solar panel devices according to the aforementioned first aspect, wherein the at least two solar panel devices, in operation, convert solar energy into electricity; and at least one electrical device electrically coupled to the at least two solar panel devices, wherein the at least one electrical device, in operation, receives the electricity from the at least two solar panel devices.

The present disclosure provides a solar panel device that can be easily transferred from one location to another location. The support structure of the solar panel device is sturdy and has structural ability to withstand high horizontal forces caused by wind flow as well as vertical forces caused by snow and ice. The support structure of the solar panel device does not require to be permanently mounted on the ground, and as a result, the solar panel device can be easily transferred from one location to another location. Ease in transferability of the solar panel device minimizes investment risks associated with installation of the solar panel device owing to the fact that that the solar panel device can be relocated from one location to another location as and when required (for example, at the end of a rental agreement for a premises where the solar panel device is installed). Therefore, a cost associated with the solar panel device can be fully recovered. This enables new business models and new financing options for solar power developers, as well as investors. For example, the transferability of the solar panel device having high structural stability enables a second-hand market for solar power plants (namely, solar panel systems). As another example, solar power plants having the solar panel devices described herein can be used as collateral assets in lease agreements since if a lessee fails payment, a lessor can easily recover the asset for resale. Moreover, as ground-mount installations are not required for the solar panel device, a number of suitable soil types for installing the solar panel device is increased. A transferable solar powerplant does not require permits and neither does it incur property tax liabilities. Furthermore, ease in transferability of the solar panel device make the availability of the solar panel device more feasible leading to creation of new businesses based on harnessing the solar energy. Moreover, the solar panel device does not incur a heavy cost for installation.

In addition to above, the at least one frame of the solar panel device is rotatable with respect to the support structure, therefore, the at least one frame can be suitably aligned with respect to the ground surface depending upon a force being experienced by the at least one solar panel. The alignment of the at least one frame with respect to the ground surface results in best harnessing the solar energy available at the particular location, thereby enhancing performance of the solar panel device. Further, the alignment of the at least one frame results in an ability of the at least one solar panel to withstand high wind force, thereby increasing life cycle of the at least one solar panel as the chances of damage to the at least one solar panel due to torsional galloping are significantly reduced. The solar panel device is able to withstand winds ranging from 10 m/s to 60 m/s.

The term "support structure" refers to a component which primarily serves to support the solar panel device on the ground surface. The support structure may be detachably installed on the ground surface. The detachable installation of the support structure helps in removal of the solar panel device with ease. Optionally, the support structure is installed on the ground surface via at least one foundation member. In an embodiment, the at least one foundation member is implemented as at least one of: a concrete weight, a concrete ballast, a steel pile, an earth anchor, a bonded anchor, a mechanical anchor. The at least one foundation member has a weight such that is can efficiently stabilize the support structure. As an example, the weight of the at least one foundation member may be equal to 3 kilograms (kg). The support structure can be fixedly or removably attached with the at least one foundation member. The support structure is attached to the at least one foundation member by means of using a screw, a rivet, an adhesive, a fast-lock system, and the like.

The support structure has a body. The body of the support structure may be solid or hollow. In an embodiment, the support structure has a body that includes at least one hollow portion, wherein the at least one hollow portion is designed to hold the at least one load therein. The technical effect of this is that when the at least one load is held in the at least one hollow portion, the at least one load is not exposed to winds, moisture, etc, in the environment. Moreover, in such a case, the at least one load does not move (for example) due to the winds, and thus does not de-stabilise the solar panel device. As a result, the at least one load has a long life and stability of the solar panel device is not compromised. Furthermore, in such a case, the solar panel device appears aesthetically appealing.

Optionally, the body is implemented as one of: an assembly of one or more elongate elements, a U-shaped element. The one or more elongate elements are joined together to fabricate a stand-like structure to be placed on the ground surface. The U-shaped element is mounted on the ground surface, for example, by anchoring it to the ground surface via the at least one foundation member. In this regard, the at least one foundation member could be for example, but not limited to, at least one bonded anchor, at least one mechanical anchor.

The support structure is made of a material having properties of high rigidity, high tensile strength, corrosion resistance, and the like. The material is selected such that the support structure has enough tensile strength to withstand forces being experienced by the solar panel device. The material is selected from a group consisting of a metal such as, but not limited to, steel, iron, aluminium.

The at least one frame is used to enclose the at least one solar panel. Optionally, the at least one frame has a plurality of sides to adequately enclose the at least one solar panel. Optionally, a number of the plurality of sides of the at least one frame is equal to a number of sides of the at least one solar panel. The at least one frame has dimensions complementary to dimensions of the at least one solar panel. A length and a width of the at least one frame may lie in range of 2000 millimetres (mm)-2500 mm and 1000 mm-1500 mm respectively. Furthermore, a weight of the at least one frame may be determined depending upon a weight of the at least one solar panel such that the at least one frame is able to efficiently support the weight of the at least one solar panel. As an example, the weight of the at least one frame may be 25 kg and the weight of the at least one solar panel may be 35 kg. The at least one frame has enough strength and rigidity to support a weight of the at least one solar panel. The at least one frame is made of a material having properties of rigidity, tensile strength, corrosion resistance etc. The material is selected from a group consisting of a metal such as, but not limited to, steel, iron, aluminium.

The at least one solar panel is made of a plurality of solar cells integrated together in a matrix-like structure. The dimensions of the at least one solar panel depend upon a number of solar cells used to manufacture the given solar panel. In an embodiment, an area of the at least one solar panel lies in a range of 1.6 square metres-2.5 square metres. The at least one solar panel is installed in an inclined position with respect to the ground surface to maximize a collection efficiency of the plurality of solar cells. In this regard, the at least one solar panel is inclined at an angle such as 20 degrees, 25 degrees, 30 degrees, 45 degrees, 55 degrees, 60 degrees, or similar. Further, the at least one solar panel is installed at a height (ground clearance) of approximately 2.1 metre (m) from the ground surface. This ground clearance is provided by way of structural configuration of the at least one frame and the support structure.

The at least one frame is rotatably coupled to the support structure. In an embodiment, the at least one frame is rotatably coupled to the support structure via the at least two attachment means that are arranged on two opposite sides of the at least one frame, wherein the at least two attachment means lie along a rotational axis of the at least one frame and enable rotation of the at least one solar panel with respect to the ground surface. Optionally, a given attachment means is implemented as one of: a hinge or hinge-like part. The technical effect of this is that the at least one frame rotates along the rotational axis resulting in alignment of the at least one solar panel with respect to the ground surface in response to a wind force being experienced by the at least one solar panel. Therefore, the solar panel device can adequately harness the solar energy without getting damaged due to the wind force. The solar panel device is able to withstand wind force (i.e., wind load) lying in a range of 10 Newtons per square metre ($N/m^2$) to 100 $N/m^2$.

In an embodiment, the rotational axis of the at least one frame lies at a predefined distance from a central axis of the at least one frame which extends between the two opposite sides of the at least one frame, wherein the predefined distance lies in a range of 20%-80% of a total distance from the central axis to an end of the at least one frame. The rotational axis is provided at the predefined distance from the central axis of the at least one frame, i.e., the rotational axis is decentred with respect to the at least one frame. A desired solution would be that the rotational axis is placed as close as possible to the end of the at least one frame. However, the closer the rotational axis is placed to the end of the at least one frame, heavier is the at least one load required to overcome a leverage force of the weight of the at least one solar panel relative to the rotational axis. A solution for minimizing a weight of the at least one load needed for rotating the at least one solar panel to the (desired) given angle would be to have the rotational axis as close to the central axis of the at least one frame. Therefore, the predefined distance of the rotational axis from the central axis is selected in such a way that a balance is struck between sensitivity of the rotation of the at least one solar panel to external forces and a weight of the at least one load implemented to provide counterbalancing force to the solar panel device. For example, the predefined distance is 20%, 25%, 30%, 40%, or 60% of the total distance from the central axis to the end of the at least one frame up to 35%, 50%, 60%, 70%, 75% or 80% of the total distance from the central axis to the end of the at least one frame. The technical effect of this decentring of the rotational axis is that external vertical and horizontal forces get efficiently transformed into the rotational forces relative to the rotational axis. Therefore, it enables effective rotation of the at least one frame with respect to the support structure.

Optionally, the at least one frame comprises a first frame adapted to enclose a first solar panel and a second frame adapted to enclose a second solar panel, the first frame and the second frame being arranged at different positions with respect to the support structure. The first frame is provided at a specific position with respect to the second frame. The positions of the first frame and the second frame are determined such that their corresponding solar panels receive enough solar energy without obstructing each other's reception of solar energy, thereby resulting in a required efficient performance of the solar panel device. Furthermore, positions of the first frame and the second frame are determined in a manner that they do not collide with each other upon rotation. In an embodiment, the first frame is provided above the second frame. In another embodiment, the second frame is provided above the first frame. In yet another embodiment, the first frame is provided adjacent to the second frame. In still another embodiment, the first frame and the second frame are arranged diagonally with respect to each other. The technical effect of employing multiple frames that enclose multiple solar panels in a single solar panel device is that a larger amount of solar energy is utilized by employing the first solar panel and the second solar in combination as compared to employing only a single solar panel in a single frame. This results in an enhanced performance of the solar panel device as compared to conventional solar panel devices. It will be appreciated that other arrangements of the first frame and the second frame which result in enhanced performance of the solar panel device are well within the scope of the present disclosure.

Optionally, the solar panel device further comprises a wire or a rope connected to the first frame and the second frame, wherein the wire or the rope enables synchronous rotation of the first frame and the second frame with respect to the ground surface. As an example, the wire of the rope may be attached between the first frame and the second frame. In this case, when the first frame is rotated due to the at least one load connected with the first frame, the wire or the rope enables synchronous rotation of the second frame with the first frame. Owing to the above, both the first and second frames are efficiently rotated with respect to the support structure. Such an implementation also facilitates in reducing a number of loads that are required to provide counterbalancing support. For example, a single load may be attached to the second frame and when the second frame rotates, the wire or rope connected to the first frame and the second frame enables the first frame to synchronously rotate with the second frame. In this way, a single load can be used for synchronous rotation of multiple interconnected frames.

The at least one connecting member is used to mechanically couple the at least one load with the support structure and the at least one frame. The at least one connecting member is made of a material such that it has enough flexibility and tensile strength to efficiently withstand weights of the at least one frame and the support structure and to facilitate rotation of the at least one frame. A material of the at least one connecting member could be for example metal, plastic, hybrid-material, or any combination thereof.

In an embodiment, the at least one connecting member may be thermally expandable, wherein the at least one connecting member expands and/or contract based on a temperature to which it is exposed, to cause rotation of the at least one frame with respect to the ground surface. The at least one connecting member expands when the temperature is high and contracts when the temperature is low, resulting in rotation of the at least one frame with respect to the ground surface. Upon expansion of the at least one connecting member, an angle between a top surface of the at least one solar panel and the ground surface increases, and vice versa. The at least one connecting member is made of a thermally-sensitive material. The thermally-sensitive material of the at least one connecting member could be for example metal, plastic, hybrid-material, or any combination thereof. The technical effect of this is that such a connecting member facilitates tilting of the at least one solar panel depending upon varying temperatures through a day resulting in the best harnessing of the available solar energy Optionally, the at least one connecting member is implemented as at least one of: a wire, a hinged strut, a rope. The at least one connecting member has the first end, the second end, and the intermediate portion. The first end of the at least one connecting member is secured (for example, by mechanical joining using adhesive, screw, heat-sealing, knotting, and the like) to the at least one frame at the first attachment point. The intermediate portion of the at least one connecting member is coupled (for example, by winding, threading (i.e., looping through an element), knotting, and the like) to the support structure on the at least one second attachment point. The second end of the at least one connecting member has the at least one load attached thereto. The at least one load is attached on the second end using a fastener, a hook, an adhesive, and the like.

Optionally, the second end of the at least one connecting member is connected to the support structure on at least one third attachment point. In such a case, the at least one load may be provided between at least one of: the first end and the intermediate portion, the intermediate portion and the second end, of the at least one connecting member.

In an embodiment, the solar panel device further comprises at least one fastening member attached to the at least one frame on the at least one first attachment point and to the support structure on the at least one second attachment point. The at least one fastening member is attached to the at least one frame and to the support structure by means of welding, using an adhesive, or the like. The technical effect of this is that the at least one fastening member provides an efficient means of attachment of the at least one connecting member with the at least one frame and the support structure, thereby enabling the required rotation of the at least one frame with respect to the support structure. Optionally, the at least one fastening member is implemented as at least one eye bolt. The at least one eye bolt is used to fasten the at least one connecting member with the at least one frame and the support structure (for example, by looping the at least one connecting member through the at least one eye bolt, knotting the at least one connecting member at the at least one eye bolt, or similar). Optionally, the at least one connecting member passes through the at least one fastening member. This results in lessening of friction during movement (such as sliding, or extension or retraction, or similar) of the at least one connecting member. Alternatively, optionally, the at least one fastening member along with the at least one connecting member, implements a pulley system for rotating the at least one solar panel with respect to the ground structure.

The term "load" refers to an element that provides a counterbalancing force for stabilizing the at least one solar panel at the given angle (which is a desired static angle at a given time) with respect to the ground surface. At such an alignment of the at least one solar panel, it is at the given angle with respect to the support structure. The at least one load provides the counterbalancing force required to align the at least frame with respect to the ground surface at the given angle. The at least one load is coupled to the support structure and the at least one frame using the at least one connecting member. This counterbalancing force is provided against external forces acting on the solar panel device, so as to provide structural stability to the solar panel device. The at least one load is placed at a suitable distance away from the rotational axis of the at least one frame. This suitable distance is provided, for example, by a separation between the first end and the second end of the at least one connecting member, and is determined such that enough leverage force is attained by the at least one load to be able to effectively rotate and balance the at least one frame with respect to the support structure. A weight of the at least one load lies in a range of A-B units. As an example, the weight of the at least one load may be 35 kg. Optionally, the at least one load is hanged from the support structure using the at least one connecting member. In such a case, the at least one load is attached at the second end of the at least one connecting member and is suspended above the ground surface.

In an embodiment, the at least one load may be implemented as at least one of: a weight, a spring element, an expandable wire, an expandable rope. In one implementation, the at least one load is at least one weight, and therefore the counterbalancing force required to align the at least frame with respect to the support structure is provided by a gravitational force of the weight. In another implementation, the at least one load is at least one spring element, and therefore, the counterbalancing force required to align the at least frame with respect to the support structure is provided by a spring force of the at least one spring element. In yet another implementation, the at least one load is at least one expandable wire, and therefore, the counterbalancing force required to align the at least frame with respect to the support structure is provided by a force generated upon expansion and contraction of the at least one expandable wire. The technical effect of said implementations of the at least one load is that the at least one load imparts the required counterbalancing force to stably balance the at least one solar panel at the given angle with respect to the ground surface.

The at least one connecting member is able to move between the at least frame and the support structure resulting in a required alignment of the at least frame with respect to the support structure. In some instances, the at least one connecting member slidably moves with respect to the at least one frame and the support structure. In some other instances, the at least one connecting member extends or retracts between the at least frame and the support structure. Other instances of other types of movement of the at least one connecting member that facilitate alignment of the at least frame with respect to the support structure are also feasible. The alignment of the at least one frame with respect to the support structure enables alignment of the at least one solar panel with respect to the ground surface at the given angle. Herein, the at least one load balances a weight of the at least one solar panel and the at least one frame with respect to external forces acting on the solar panel device.

Optionally, the given angle lies in a range of 0 degrees, 5 degrees, 10 degrees, 20 degrees, 40 degrees, 60 degrees, or 80 degrees up to 100 degrees, 120 degrees, 135 degrees, 150 degrees, 160 degrees, 170 degrees, 175 degrees, or 180 degrees. It will be appreciated that the given angle is not static and dynamically changes according to forces experienced by the solar panel device, a time of the day, or similar. Irrespective of what the given angle at a given time instant is, the at least one load and the at least one connecting member provide structural stability to the solar panel device.

The rotation of the at least one frame is caused by the external forces being experienced by the at least one solar panel. For example, in a case when an external force caused by wind is more than the counterbalancing force imparted by the at least one load, the at least one connecting member may extend (or may slide) in a manner that results in rotation of the at least one frame towards a direction of the external force. As an example, the at least one frame (and the at least one solar panel) may be at an angle of 45 degrees with respect to the ground surface when there is nil or negligible external force. When the wind starts blowing towards a front face (i.e., a photo-sensitive surface) of the at least one solar panel, the at least one frame (and the at least one solar panel) may rotate in a direction of the wind and making, for example, an angle of 0 degrees with respect to the ground surface. Next, when the external force weakens slightly as compared to the counterbalancing force imparted by the at least one load, the at least one connecting member may retract (or may slide) in a manner that results in rotation of the at least one frame towards a direction of the counterbalancing force. Upon such re-alignment, the at least one frame (and the at least one solar panel) may be at an angle of 60 degrees with respect to the ground surface.

Optionally, the solar panel device further comprises at least one turnbuckle connected at the first end and/or the second end of the at least one connecting member, the at least one turnbuckle being configured to automatically extend or retract, based on a temperature of its surroundings, to enable alignment of the at least one frame with respect to the support structure. The at least one turnbuckle is provided to adjust tension or length of the at least one connecting member to enable rotation of the at least one frame with respect to the support structure. The at least one turnbuckle optionally has two end-fitting portions. In an embodiment, one of the two end fitting portions is attached to the first attachment point of the at least one frame and other of the two end fitting portions is attached to the first end of the at least one connecting member. In another embodiment, one of the two end fitting portions is attached to the at least one load and other of the two end fitting portions is attached to the second end of the at least one connecting member. The two end fitting portions of the at least one turnbuckle can have different shapes. The two end fitting portions could have shapes such as a loop, a jaw, a hook, and the like. The at least one turnbuckle is temperature sensitive such that the at least one turnbuckle enables sliding of the at least one connecting member depending upon a temperature of its surroundings. The at least one turnbuckle has a predefined operating temperature range. The temperature range lies in range of minus 40 degrees Celsius to 180 degrees Celsius. For example, the temperature may be in range of minus 40 degrees Celsius, minus 20 degrees Celsius, 0 degrees Celsius, 10 degrees Celsius, 20 degrees Celsius, 40 degrees Celsius, or 60 degrees Celsius up to 25 degrees Celsius, 50 degrees Celsius, 75 degrees Celsius, 100 degrees Celsius, 125 degrees Celsius, 150 degrees Celsius, or 180 degrees Celsius. The technical effect of this that the turnbuckle enable sliding of the at least one connecting member based upon temperature variation through the day. Therefore, results in best harnessing the solar energy available at a location.

Optionally, the solar panel device further comprises at least one flexible member provided in the support structure, wherein the at least one flexible member facilitates adjustment of height of the support structure. The at least one flexible member is optionally provided in the body of the support structure. In an embodiment, the at least one flexible member is fitted in the one or more elongate elements of the body of the support structure. In another embodiment, the at least one flexible member is used to implement the one or more elongate elements of the body of the support structure. Optionally, the at least one flexible member is provided in each of the one or more elongate elements of the body. Alternatively, optionally, the at least one flexible member is provided in at least one of the one or more elongate elements of the body. Owing to the presence of the at least one flexible member, the one or more elongate elements of the body retract or extend (i.e., contract or expand) in response to the wind force being experienced by the solar panel. As an example, in the case of strong wind force on the solar panel, the at least one flexible member may contract resulting in shortening in the height of the one or more elongate elements. This results in lowering of height of the solar panel device for stability and for protecting the at least one solar panel from damage. When such wind is no longer present, the at least one flexible member may expand to its default height resulting in increase in the height of the one or more elongate elements. Optionally, the at least one flexible member is implemented as at least one of a spring, a telescopic element.

In an embodiment, the solar panel device further comprises a processor and at least one actuator coupled to a shaft of support structure, wherein the processor is configured to generate a drive signal for controlling the at least one actuator, based at least on a time of a day, wherein the drive signal enables the at least one actuator to rotate the shaft to adjust the given angle of the at least one solar panel with respect to the ground surface. The term "processor" relates to a computational element that is configured to process (i.e., execute) instructions and processing operations. Optionally, the at least one actuator is implemented as a part of at least one of: an electric motor, a stepper motor, a hydraulic cylinder, a servo motor. Optionally, the shaft is provided at a portion of the support structure which contacts or is in proximity of the rotational axis of the at least one frame. Actuation of the at least one actuator enables rotation of the shaft which results in rotation of the at least one frame with respect to the support structure. As an example, the at least one frame may be rotated based on the time of the day, in a manner that the given angle is such that maximum possible sunlight falls on the at least one solar panel, so as to maximize collection of the solar energy by the at least one solar panel resulting in best harnessing the solar energy. In such a case, the given angle may change according to changing positions of the sun at various times during the day. For example, the given angle may be 45 degrees from midnight to 10 am, 0 degrees from 10 am to 2 pm, and 135 degrees from 2 pm to midnight. The technical effect of this is that the at least one actuator enables rotation of the solar panel device independent of the external force, which results in improving the performance of the solar panel device.

Optionally, the solar panel device further comprises at least one first sensor that, in operation, detects weather conditions of a site where the at least one solar panel device is placed, the at least one first sensor being communicably coupled to the processor, wherein the processor is configured to generate the drive signal based also on the weather conditions of the site. Optionally, the at least one sensor is implemented as at least one of: a wind speed sensor, a wind direction sensor, a temperature sensor, a humidity sensor, a dust sensor, an icing sensor. The weather conditions sensed by the at least one sensor are sent to the processor. Actuation of the at least one actuator results in rotation of the shaft resulting in alignment of the at least one frame with respect to the ground surface. As an example, the actuator may rotate the at least one shaft in a manner that the at least one frame is rotated and then aligned with respect to the ground surface in a manner that the front face of the at least one solar panel lies in the direction of the wind depending upon a wind direction received by the wind direction sensor. As another example, when the weather conditions indicate likelihood of a sandstorm, the at least one shaft may be rotated to rotatably align the at least one frame with respect to the ground surface in a manner that dust slides off and does not get accumulated on the at least one solar panel. The technical effect of this weather conditions-based actuation is that the at least one solar panel can be rotated for best harnessing of the solar energy, which improves performance of the solar panel device, for protection of the at least one solar panel from damage, and the like.

Optionally, the solar panel device further comprises at least one second sensor communicably coupled to a user device via a communication network, wherein the at least one second sensor is configured to:
  detect the given angle of the at least one solar panel with respect to the ground surface; and
  send the given angle to the user device via the communication network.

Optionally, the at least one second sensor is implemented as one at least one of: an angle sensor, an inclination sensor, a gyroscope, a camera. The at least one second sensor, in operation, detects the given angle of the at least one frame with respect to the ground surface. The given angle of the at least one frame is sent by the at least one sensor to the communication network and then sent further to the user device. The user device is implemented as a mobile phone, a desktop, a tablet, or similar. Beneficially, in this way, the user can remotely monitor the solar panel device.

Based upon the given angle received on the user device, the user can optionally also manipulate the given angle of the at least one frame with respect to the frame by way of providing an input. In this regard, the input is sent from the user device to the processor, and the processor is configured to generate the drive signal based on the input. As an example, the user may align the at least one solar panel such that its photo-sensitive surface face the sun to maximize collection of the solar energy by the at least one solar panel.

As another example, the user may align the at least one solar panel in a direction of the wind. The technical effect of this is that the user can remotely manipulate the given angle of the at least one solar panel with respect to the ground surface, resulting in best harnessing the solar energy, in providing stability of the solar panel device, and in enhancing performance of the solar panel device.

Optionally, the solar panel device further comprising at least one motion sensor that, in operation, detects presence of an object in proximity of a solar panel device and a processor communicably coupled to the at least one motion sensor, wherein the processor is configured to:
  receive sensor data from the motion sensor; and
  trigger an alarm indicative of the presence of the object, based on the sensor data.

Optionally, the at least one motion sensor is implemented as at least one of: a passive infrared (PIR) sensor, an active ultrasonic sensor. The at least one motion sensor detects presence of the object such as a human, an animal, a robot, a drone, or similar, in the proximity of the solar panel device and sends the sensor data (indicative of such detection) to the processor. Based upon the sensor data, the processor signals intrusion in vicinity of the solar panel device by triggering the alarm. optionally, the alarm is at least one of: an acoustic alarm, a visual alarm, a vibration alarm. The alarm is triggered so as to alert the object in proximity of the solar panel device to move away from the solar panel device. The presence of the at least one motion sensor is crucial for enabling avoiding contact of any object with the solar panel device as the solar panel device is a rotatable device and produces electricity. The solar panel device can be damaging or even fatal to the object coming in contact with it. The technical effect of this implementation is that it provides an efficient warning system to mitigate the risk of accident due to the solar panel device, damage to the solar panel device, and similar.

Optionally, the solar panel device further comprising at least one third sensor that is configured to:
  detect an amount of sunlight at a site where the solar panel device is placed; and
  send information indicative of the amount of sunlight at the site to at least one of a user device, a processor.

In this regard, the information indicative of the amount of sunlight is received on the user device and can be used for monitoring purposes. Based upon the information received, the user can determine an expected amount of solar energy that can be harnessed for process monitoring and forecasting purposes. The at least one third sensor is optionally implemented as at least one luminosity sensor.

The present disclosure also relates to the solar panel system as described above. Various embodiments and variants disclosed above, with respect to the aforementioned first aspect, apply mutatis mutandis to the solar panel system.

Optionally, in the solar panel system, the at least two solar panel devices are electrically connected with each other. Optionally, the at least one solar panel devices are arranged as an array, wherein the array is a one-dimensional array, a two-dimensional array or a three-dimensional array. Optionally, the at least one electrical device is implemented as at least one of: an inverter, a power grid, a transformer, a switched-mode power supply. In an example, the at least two solar panel devices may generate of the electricity in form of a direct current. The direct current may then passed through the inverter to convert it into an alternating current. The alternating current may then used by homes, factories or any other similar facilities where the electricity is required.

It will be appreciated that components (the at least one load, the at least one frame, the support structure) of a given solar panel device are manufactured separately and transported to a site of installation. At the site of installation, aforesaid components are assembled together to form the solar panel device. Owing to the above, no torsional forces are generated while transporting the solar panel device, therefore, the risk of damage to the solar panel device is significantly reduced. In addition to above, aforesaid components can be easily separated and transported to another location wherever required, thereby providing flexibility of easy transportation of the solar panel system form one location to another location.

DETAILED DESCRIPTION OF THE DRAWINGS

Referring to FIG. 1A, illustrated is a perspective view of a solar panel device 100a at a given angle with respect to a ground surface, in accordance with an embodiment of the present disclosure. The solar panel device 100a comprises a support structure 102, at least one frame 104 adapted to enclose at least one solar panel 106, at least one connecting member 108, and at least one load 110 coupled to the support structure 102 and the at least one frame 104 using the at least one connecting member 110. A second end 108b of the at least one connecting member 108 has the least one load 110 attached thereto. The support structure 102 is installed on the ground surface using at least one foundation member, (depicted as four foundation members 112a, 112b, 112c, 112d). The at least one frame 104 is aligned, for example, at a given angle of 45 degrees with respect to the ground surface. Said given angle is achieved when there is negligible or minimal force exerted by wind on the at least one solar panel 106. The at least one frame 104 is rotatably coupled to the support structure 102 via at least two attachment means 114a and 114b.

Figure 1B:
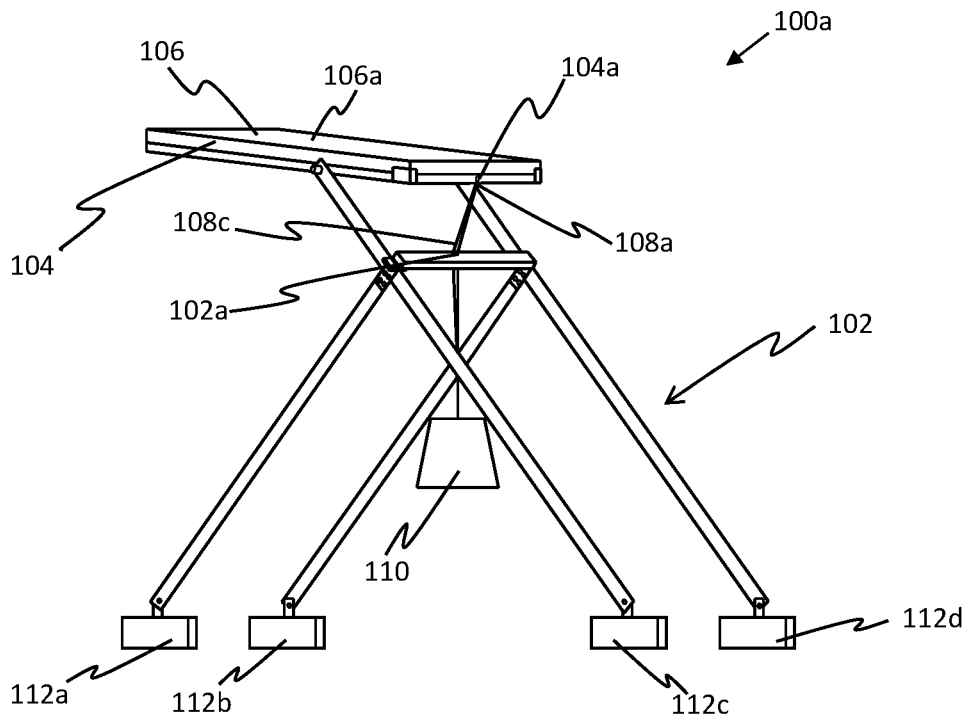
FIG. 1B is a perspective view of the solar panel device of FIG. 1A at another given angle with respect to the ground surface, in accordance with an embodiment of the present disclosure.

Referring to FIG. 1B, illustrated is a perspective view of the solar panel device 100a of FIG. 1A at another given angle with respect to the ground surface, in accordance with an embodiment of the present disclosure. A first end 108a of the at least one connecting member 108 is fastened to the at least one frame 104 on at least one first attachment point 104a. An intermediate portion 108c of the at least one connecting member 108 is connected to the support structure 102 on at least one second attachment point 102a. The at least one connecting member 108 moves (i.e., slide, extends or retracts, or similar) between the at least one frame 104 and the support structure 102 in a manner that results in rotation of the at least one frame 104 in the direction of the wind, when the counterbalancing force imparted by the at least one load 110 is less than the force exerted by the wind. The at least one solar panel 106 is aligned, for example, horizontally to the ground surface in manner that the front surface 106a of the at least one solar panel 106 faces the sky. In such a case, the direction of wind is considered to be from a front surface 106a of the at least one solar panel 106 to a back surface of the at least one solar panel 106.

Figure 1C:
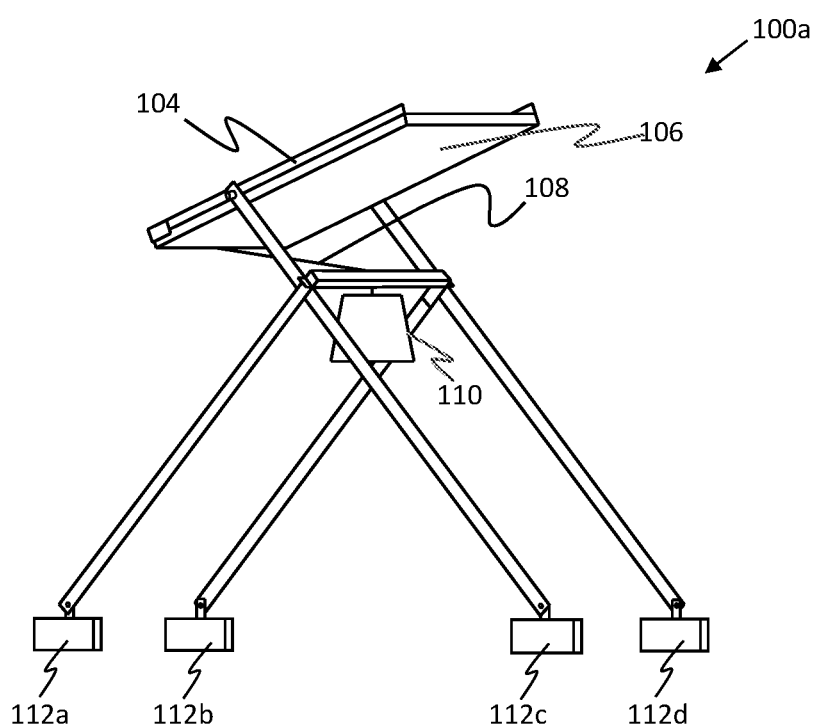
FIG. 1C is a perspective view of the solar panel device of FIG. 1A at yet another given angle with respect to the ground surface, in accordance with an embodiment of the present disclosure.

Referring to FIG. 1C, illustrated is a perspective view of the solar panel device 100a of FIG. 1A at yet another given angle with respect to the ground surface, in accordance with an embodiment of the present disclosure. at least one load 110 moves upwards due The at least one connecting member 108 is moved resulting in rotation of the at least one frame 104 in the direction of the wind, when the counterbalancing force imparted by the at least one load 110 is less than the force exerted by the wind. The at least one solar panel 106 is aligned, for example, nearly horizontally with respect to the ground surface. In such a case, a direction of wind is considered to be from a back surface of the at least one solar panel 106 to a front surface 106a of the at least one solar panel 106.

FIGS. 1A-1C are merely examples, which should not unduly limit the scope of the claims herein. A person skilled in the art will recognize many variations, alternatives, and modifications of embodiments of the present disclosure. For example, the at least one frame 104 may be aligned at any given angle lying in a range of 0 degrees-180 degrees depending upon the force being exerted on the at least one solar panel 106 by the wind.

Figure 2:
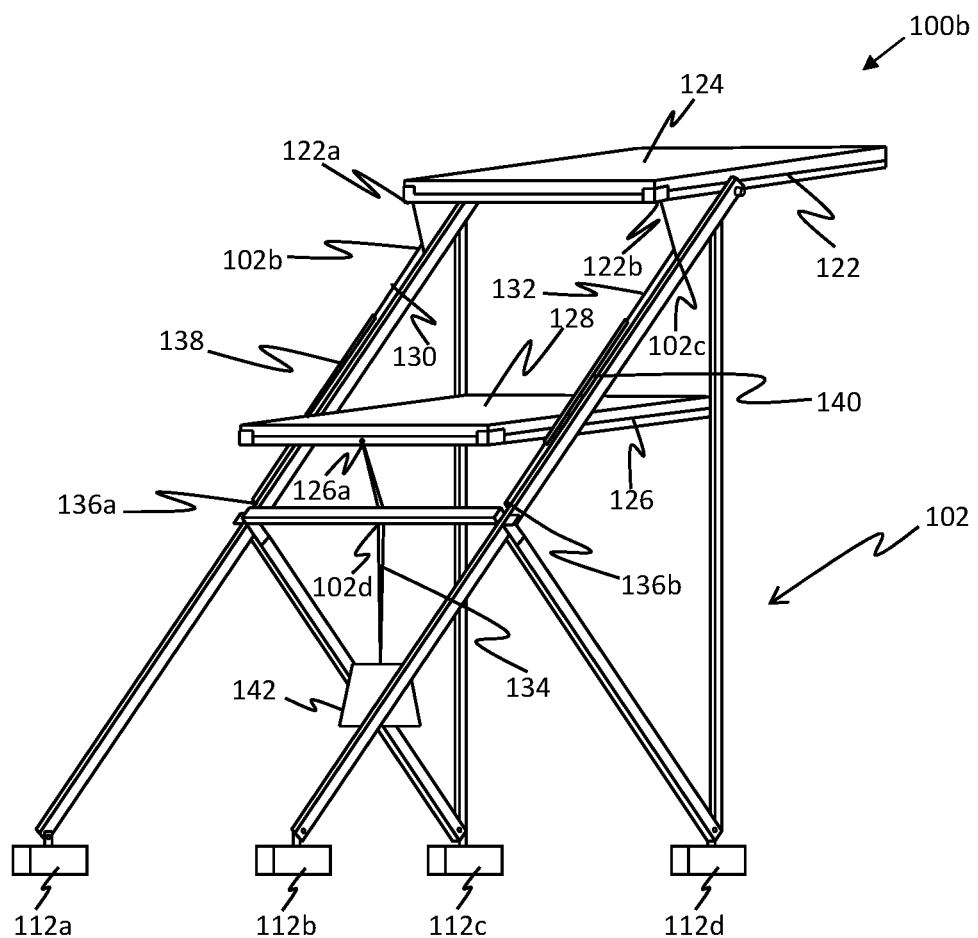
FIG. 2 is a perspective view of a solar panel device, in accordance with another embodiment of the present disclosure.

Referring to FIG. 2, illustrated is a perspective view of a solar panel device 100b, in accordance with another embodiment of the present disclosure. Corresponding components of the solar panel device 100b of FIG. 2 and the solar panel device 100a of FIGS. 1A-1C are referenced with same numerals for sake of simplicity. At least one frame of the solar panel device 100b comprises a first frame 122 adapted to enclose a first solar panel 124 and a second frame 126 adapted to enclose a second solar panel 128. The first frame 122 is, for example, provided above the second frame 126. At least one connecting member of the solar panel device 100b is shown to comprise a first connecting member 130, a second connecting member 132, and a third connecting member 134.

A first end of the first connecting member 130 is fastened to the first frame 122 on a first attachment point 122a, an intermediate portion of the first connecting member 130 is connected to the support structure 102 on a second attachment point 102b, and a second end of the first connecting member 130 is connected to the support structure 102 on a third attachment point 136a. In such a case, a load 138 is, for example, provided between the intermediate portion and the second end of the first connecting member 130.

A first end of the second connecting member 132 is fastened to the first frame 122 on a first attachment point 122b, an intermediate portion of the second connecting member 132 is connected to the support structure 102 on a second attachment point 102c, and a second end of the second connecting member 132 is connected to the support structure 102 on a third attachment point 136b. In such a case, a load 140 is, for example, provided between the intermediate portion and the second end of the second connecting member 132.

A first end of the third connecting member 134 is fastened to the second frame 126 on a first attachment point 126a, an intermediate portion of the third connecting member 134 is connected to the support structure 102 on a second attachment point 102d, and a second end of the third connecting member 134 has a load 142 attached thereto.

The connecting members 130, 132, and 134 enable rotation of the first frame 122 and the second frame 126 with respect to the support structure 102 such that the solar panels 124 and 128 are at required given angles with respect to a ground surface on which the support structure 102 is arranged.

FIG. 2 is a merely example, which should not unduly limit the scope of the claims herein. A person skilled in the art will recognize many variations, alternatives, and modifications of embodiments of the present disclosure.

Figure 3A:
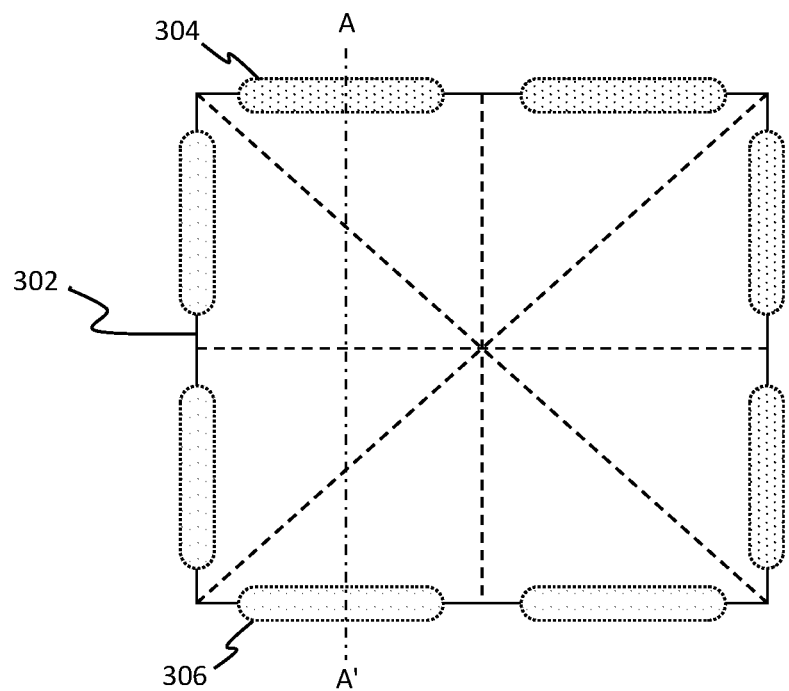
FIG. 3A is a schematic illustration of suitable areas for placement of at least two attachment means along a rotational axis of at least one frame, in accordance with an embodiment of the present disclosure.

Referring to FIG. 3A, illustrated is a schematic illustration of suitable areas for placement of at least two attachment means along a rotational axis of at least one frame (depicted as a frame 302), in accordance with an embodiment of the present disclosure. The suitable areas are represented as dotted-hatched regions along edges of the frame 302. If, for example, the rotational axis is A-A' (depicted as a dash-dot axis), the at least two attachment means can be placed in areas 304 and 306 of the frame 302.

Figure 3B:
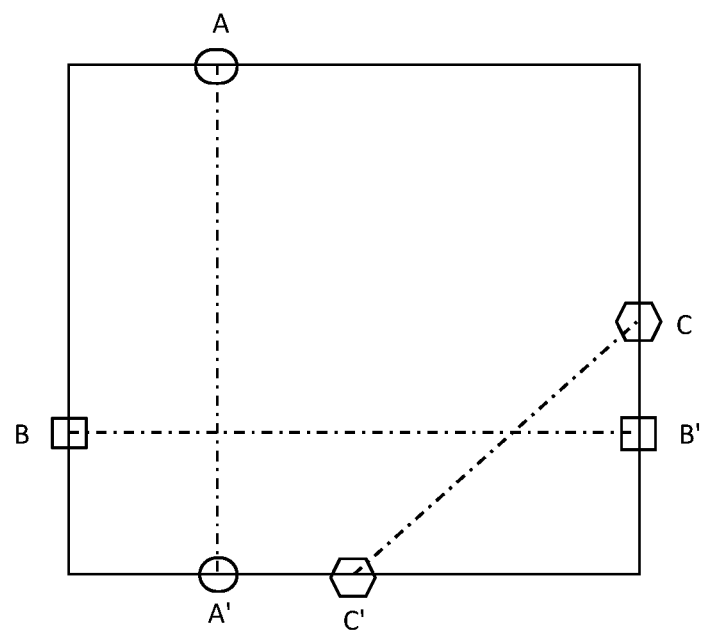
FIG. 3B is a schematic illustration of exemplary positions for placement of at least two attachment means along a rotational axis of at least one frame, in accordance with an embodiment of the present disclosure.

Referring to FIG. 3B, illustrated is a schematic illustration of exemplary positions for placement of the at least two attachment means along a rotational axis of at least one frame, in accordance with an embodiment of the present disclosure. In an example, if the rotational axis is A-A', the at least two attachment means can be placed on the frame 302 at two positions depicted by two circles lying along the rotational axis A-A'. In another example, if the rotational axis is B-B', the at least two attachment means can be placed on the frame 302 at two positions depicted by two squares lying along the rotational axis B-B'. In yet another example, if the rotational axis is C-C', the at least two attachment means can be placed on the frame 302 at two positions depicted by two hexagons lying along the rotational axis C-C'.

Figure 4:
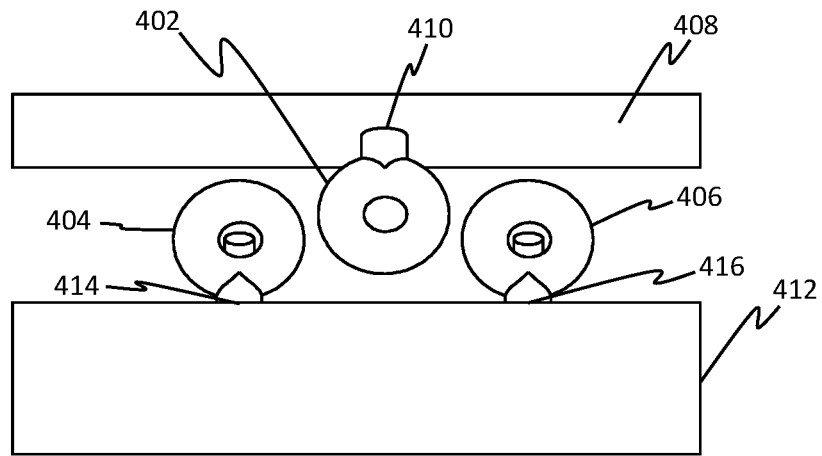
FIG. 4 is a schematic illustration of at least one fastening member attached to at least one frame on at least one first attachment point and to a support structure on at least one second attachment point, in accordance with an embodiment of the present disclosure.

Referring to FIG. 4, illustrated is a schematic illustration of at least one fastening member (depicted as fastening members 402, 404, and 406) attached to at least one frame (depicted as a frame 408) on at least one first attachment point 410 and to a support structure 412 on at least one second attachment point (depicted as second attachment points 414 and 416), in accordance with an embodiment of the present disclosure. The fastening member 402 is attached to the frame 408 at the first attachment point 410. The fastening members 404 and 406 are attached to the support structure 412 at the second attachment points 414 and 416, respectively.

FIG. 4 is merely an example, which should not unduly limit the scope of the claims herein. A person skilled in the art will recognize many variations, alternatives, and modifications of embodiments of the present disclosure.

Figure 5:
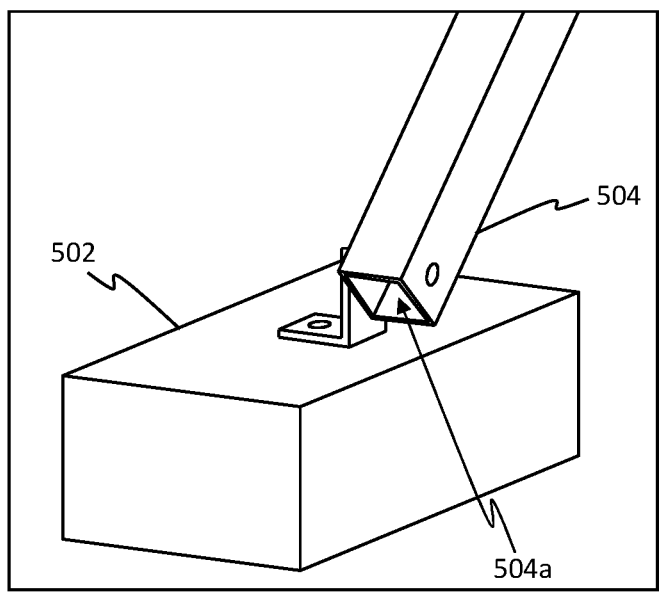
FIG. 5 is a schematic illustration of at least one foundation member on which a support structure is arranged, in accordance with an embodiment of the present disclosure.

Referring to FIG. 5, illustrated is a schematic illustration of at least one foundation member (depicted as a foundation member 502) on which a support structure is arranged, in accordance with an embodiment of the present disclosure. An elongate element 504 of the support structure is shown, for example, to be bolted on the foundation member 502. The elongate element 504 is shown to include a hollow portion 504a to hold at least one load therein.

FIG. 5 is merely an example, which should not unduly limit the scope of the claims herein. A person skilled in the art will recognize many variations, alternatives, and modifications of embodiments of the present disclosure.

Figure 6:
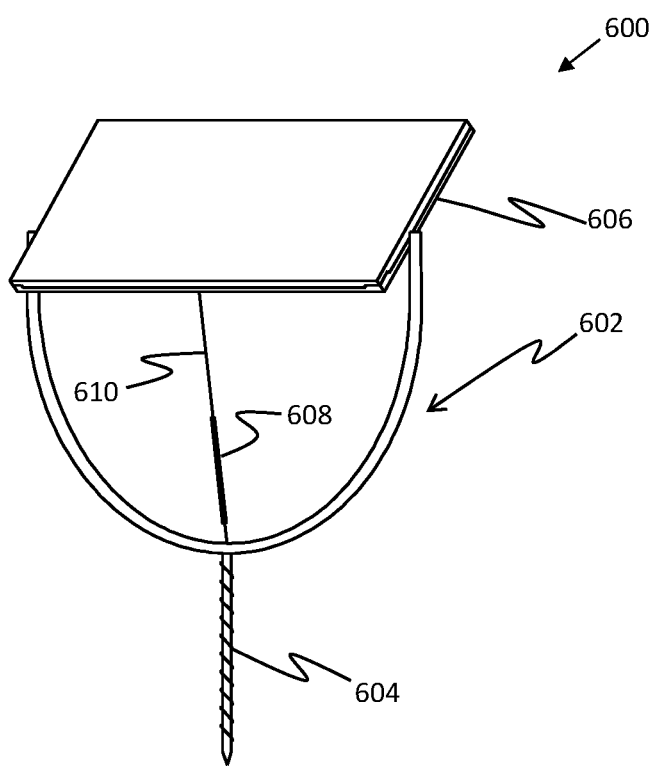
FIG. 6 is a perspective view of a solar panel device having a support structure that is implemented as a U-shaped element, in accordance with an embodiment of the present disclosure.

Referring to FIG. 6, illustrated is a perspective view of a solar panel device 600 having a support structure that is implemented as a U-shaped element 602, in accordance with another embodiment of the present disclosure. The U-shaped element 602 is arranged on a ground surface by way of at least one foundation member (depicted as a foundation member 604). At least one frame 606 is rotatably coupled to the U-shaped element 602. At least one load (depicted as a load 608) is coupled to the at least one frame 606 and the U-shaped element 602 using at least one connecting member (depicted as connecting member 610).

FIG. 6 is merely an example, which should not unduly limit the scope of the claims herein. A person skilled in the art will recognize many variations, alternatives, and modifications of embodiments of the present disclosure.

Figure 7:
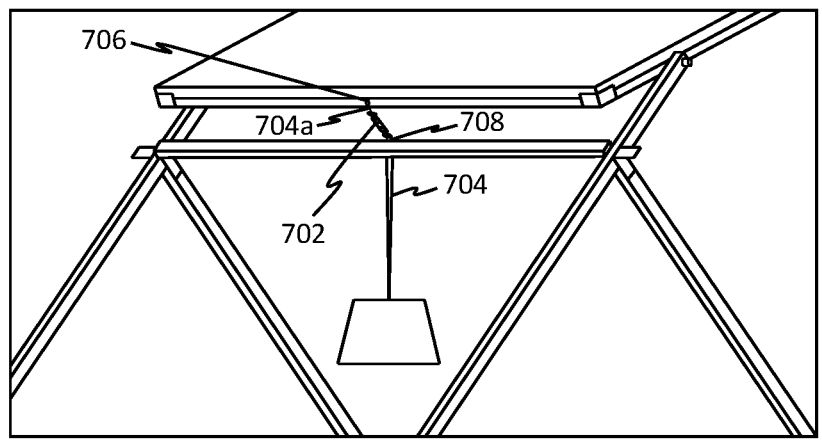
FIG. 7 is a perspective view of a solar panel device comprising at least one turnbuckle, in accordance with an embodiment of the present disclosure.

Referring to FIG. 7, illustrated is a perspective view of a solar panel device comprising at least one turnbuckle (depicted as a turnbuckle 702), in accordance with an embodiment of the present disclosure. The turnbuckle 702 is connected at a first end 704a of at least one connecting member 704. The turnbuckle is, for example, shown to be attached between a first attachment point 706 and a second attachment point 708.

FIG. 7 is merely an example, which should not unduly limit the scope of the claims herein. A person skilled in the art will recognize many variations, alternatives, and modifications of embodiments of the present disclosure.

Figure 8:
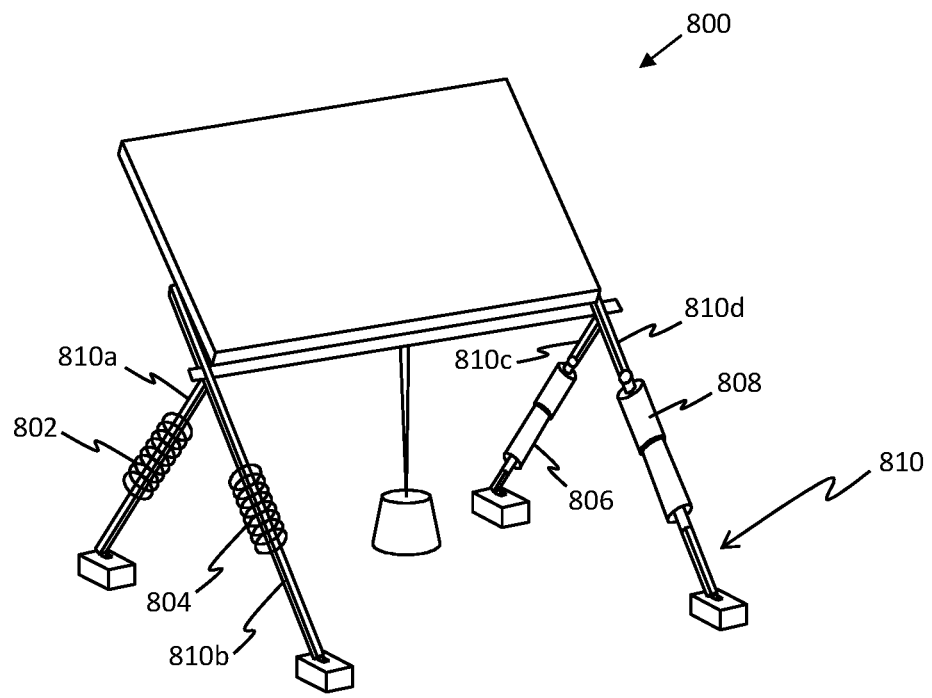
FIG. 8 is a schematic illustration of a solar panel device comprising at least one flexible member provided in a support structure, in accordance with an embodiment of the present disclosure.

Referring to FIG. 8, illustrated is a schematic illustration of a solar panel device 800 comprising at least one flexible member (depicted as flexible members 802 and 804, 806, 808) provided in a support structure 810, in accordance with an embodiment of the present disclosure. The support structure 810 includes four elongated members 810a, 810b, 810c, and 810d. As an example, each of the four elongated members 810a-d of the support structure 810 are shown to include one flexible member. The flexible members 802 and 804 are provided in form of springs, whereas the flexible members 806 and 808 are provided in form of telescopic rods. The flexible members 802, 804, 806, and 808 facilitate adjustment of height of the support structure 810.

FIG. 8 is merely an example, which should not unduly limit the scope of the claims herein. A person skilled in the art will recognize many variations, alternatives, and modifications of embodiments of the present disclosure.

Figure 9A:
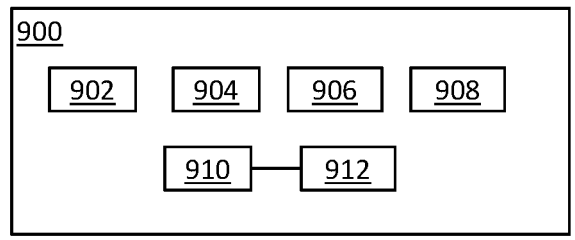
FIGS. 9A, 9B, 9C, and 9D are illustrations of architectures of a solar panel device, in accordance with various embodiments of the present disclosure.
Figure 9B:
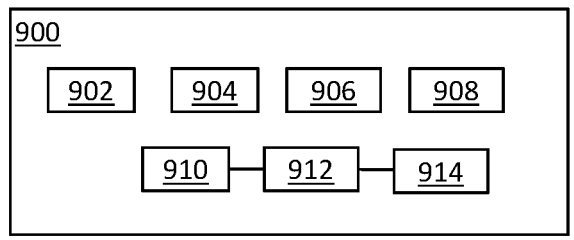
Figure 9C:
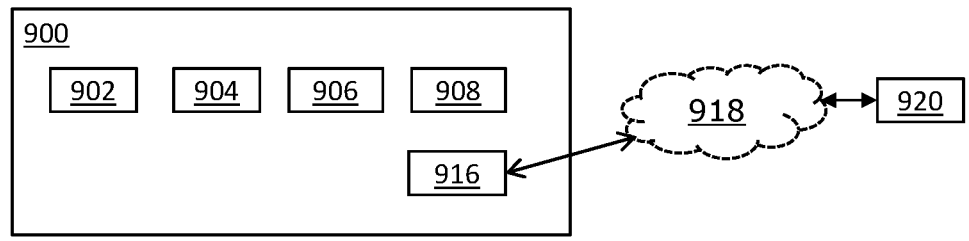
Figure 9D:
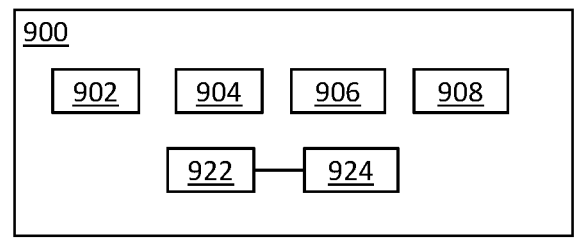

Referring to FIGS. 9A, 9B, 9C, and 9D, there are shown illustrations of architectures of a solar panel device 900, in accordance with various embodiments of the present disclosure. In FIGS. 9A-9D, the solar panel device 900 includes a support structure 902, at least one frame 904, at least one connecting member 906, at least one load 908. In FIG. 9A, the solar panel device 900 also includes a processor 910 and at least one actuator 912. The processor 910 is communicatively coupled to the at least one actuator 912. In FIG. 9B, the solar panel device 900 also includes a processor 910, at least one actuator 912 and at least one first sensor 914. The at least one processor 910 is communicatively coupled to the at least one actuator 912 and to the at least one first sensor 914. In FIG. 9C, the solar panel device 900 also includes at least one second sensor 916. The at least one second sensor 916 communicably coupled to a user device 920 via a communication network 918. In FIG. 9D, the solar panel device 900 also includes at least one motion sensor 922 and a processor 924. The at least one motion sensor 922 is communicatively coupled to the processor 924.

FIGS. 9A-9D are merely examples, which should not unduly limit the scope of the claims herein. A person skilled in the art will recognize many variations, alternatives, and modifications of embodiments of the present disclosure.

Figure 10:
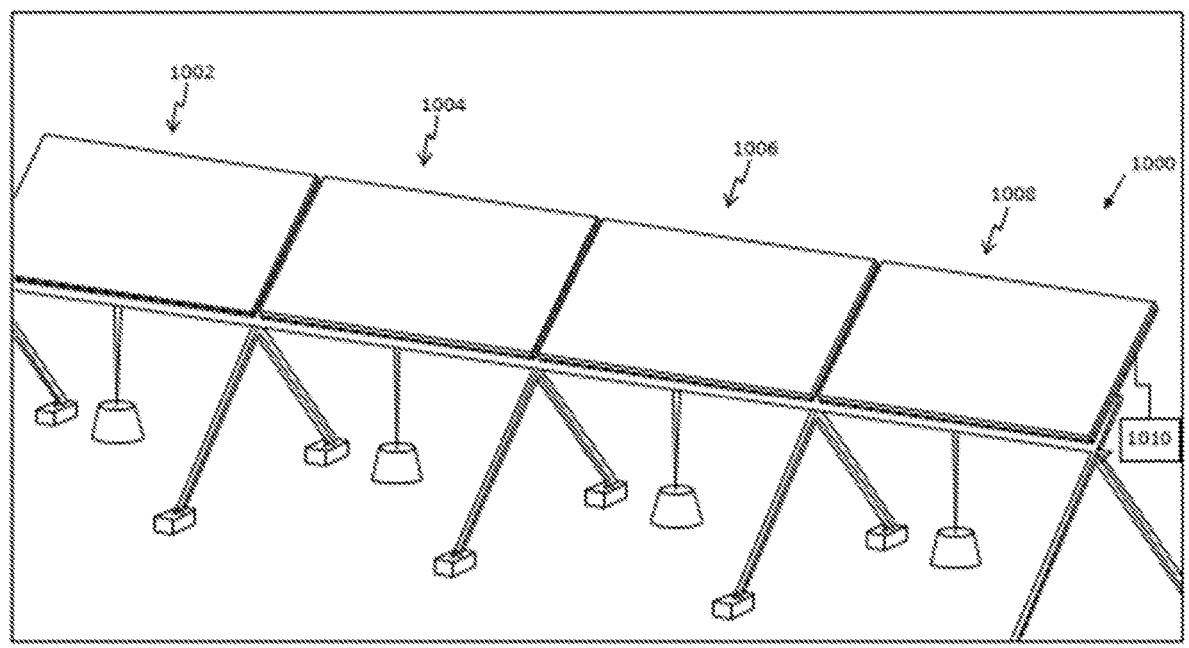
FIG. 10 is a schematic illustration of a solar panel system, in accordance with an embodiment of the present disclosure.

Referring to FIG. 10, illustrated is a schematic illustration of a solar panel system 1000, in accordance with an embodiment of the present disclosure. The solar panel system 1000 comprises at least two solar panel devices (depicted as four solar panel devices 1002, 1004, 1006, and 1008) and at least one electrical device (depicted as an electrical device 1010) electrically coupled to the solar panel devices 1002, 1004, 1006, and 1008. The solar panel devices 1002, 1004, 1006, and 1008, in operation, convert solar energy into electricity, and the electrical device 1010, in operation, receives the electricity from the solar panel devices 1002, 1004, 1006, and 1008. The solar panel devices 1002, 1004, 1006, and 1008 are electrically connected with each other.

FIG. 10 is merely an example, which should not unduly limit the scope of the claims herein. A person skilled in the art will recognize many variations, alternatives, and modifications of embodiments of the present disclosure.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A solar panel device comprising:
   a support structure;
   at least one frame configured to enclose at least one solar panel, wherein the at least one frame is rotatably coupled to the support structure;
   at least one connecting member; and
   at least one load coupled to the support structure and the at least one frame using the at least one connecting member, wherein
   a first end of the at least one connecting member is fastened to the at least one frame on at least one first attachment point,
   an intermediate portion of the at least one connecting member is connected to the support structure on at least one second attachment point, and
   a second end of the at least one connecting member has the least one load attached thereto, and wherein the at least one connecting member is configured to move between the at least one frame and the support structure for enabling the at least one load to align the at least one frame with respect to the support structure such that the at least one solar panel is at a given angle with respect to a ground surface on which the support structure is arranged;
     wherein the at least one frame is rotatably coupled to the support structure via at least two attachment means that are arranged on two opposite sides of the at least one frame, wherein the at least two attachment means lie along a rotational axis (A-A') of the at least one frame and enable rotation of the at least one solar panel with respect to the ground surface,
     wherein the rotational axis (A-A') of the at least one frame lies at a predefined distance from a central axis of the at least one frame which extends between the two opposite sides of the at least one frame, wherein the predefined distance lies in a range of 20%-80% of a total distance from the central axis to an end of the at least one frame, and
     wherein the predefined distance of the rotational axis from the central axis is selected in such a way that a balance is struck between sensitivity of the rotation of the at least one solar panel to external forces and a weight of the at least one load.

2. A solar panel device of claim 1, wherein the support structure has a body that includes at least one hollow portion, wherein the at least one hollow portion is designed to hold the at least one load therein.

3. A solar panel device of claim 1, wherein the at least one connecting member is thermally expandable, wherein the at least one connecting member one or more of expands or contracts based on a temperature to which it is exposed, to cause rotation of the at least one frame with respect to the ground surface.

4. A solar panel device of claim 1, wherein the at least one load is implemented as at least one of: a weight, a spring element, an expandable wire, an expandable rope.

5. A solar panel device of claim 1, wherein the at least one frame comprises a first frame configured to enclose a first solar panel and a second frame configured to enclose a second solar panel, the first frame and the second frame being arranged at different positions with respect to the support structure.

6. A solar panel device according to claim 1, further comprising at least one fastening member attached to the at least one frame on the at least one first attachment point and to the support structure on the at least one second attachment point.

7. A solar panel device of claim 1, further comprising at least one turnbuckle connected at one or more of the first end and the second end of the at least one connecting member, the at least one turnbuckle being configured to automatically extend or retract, based on a temperature of its surroundings, to enable sliding of the at least one connecting member based upon temperature variation through the day.

8. A solar panel device of claim 1, further comprising at least one flexible member provided in the support structure, wherein the at least one flexible member facilitates adjustment of height of the support structure.

9. A solar panel device of claim 1, further comprising a processor and at least one actuator coupled to a shaft of support structure, wherein the processor is configured to generate a drive signal for controlling the at least one actuator, based at least on a time of a day, wherein the drive signal enables the at least one actuator to rotate the shaft.

10. A solar panel device according to claim 9, further comprising at least one first sensor that, in operation, detects weather conditions of a site where the solar panel device is placed, the at least one first sensor being communicably coupled to the processor, wherein the processor is configured to generate the drive signal based also on the weather conditions of the site.

11. A solar panel device of claim 1, further comprising at least one second sensor communicably coupled to a user device via a communication network, wherein the at least one second sensor is configured to:
   detect the given angle of the at least one solar panel with respect to the ground surface; and
   send the given angle to the user device via the communication network.

12. A solar panel device of claim 1, further comprising at least one motion sensor that, in operation, detects presence of an object in proximity of the solar panel device and a processor communicably coupled to the at least one motion sensor, wherein the processor is configured to:
   receive sensor data from the motion sensor; and
   trigger an alarm indicative of the presence of the object based on the sensor data.

13. A solar panel system comprising:
   at least two solar panel devices comprising:
   a support structure;
   at least one frame configured to enclose at least one solar panel, wherein the at least one frame is rotatably coupled to the support structure;
   at least one connecting member; and
   at least one load coupled to the support structure and the at least one frame using the at least one connecting member, wherein
   a first end of the at least one connecting member is fastened to the at least one frame on at least one first attachment point,
   an intermediate portion of the at least one connecting member is connected to the support structure on at least one second attachment point, and
   a second end of the at least one connecting member has the least one load attached thereto, and wherein the at least one connecting member is configured to move between the at least one frame and the support structure for enabling the at least one load to align the at least one frame with respect to the support structure such that the at least one solar panel is at a given angle with respect to a ground surface on which the support structure is arranged;

wherein the at least one frame is rotatably coupled to the support structure via at least two attachment means that are arranged on two opposite sides of the at least one frame, wherein the at least two attachment means lie along a rotational axis (A-A') of the at least one frame and enable rotation of the at least one solar panel with respect to the ground surface, wherein the rotational axis (A-A') of the at least one frame lies at a predefined distance from a central axis of the at least one frame which extends between the two opposite sides of the at least one frame, wherein the predefined distance lies in a range of 20%-80% of a total distance from the central axis to an end of the at least one frame, and wherein the predefined distance of the rotational axis from the central axis is selected in such a way that a balance is struck between sensitivity of the rotation of the at least one solar panel to external forces and a weight of the at least one load wherein the at least two solar panel devices, in operation, convert solar energy into electricity; and at least one electrical device electrically coupled to the at least two solar panel devices, wherein the at least one electrical device, in operation, receives the electricity from the at least two solar panel devices.

\* \* \* \* \*